(12) United States Patent
de la Cal

(10) Patent No.: US 7,180,922 B2
(45) Date of Patent: Feb. 20, 2007

(54) SAFETY SYSTEM FOR FOCUSED ENERGY APPLICATIONS

(75) Inventor: Eduardo de la Cal, Putzbrunn (DE)

(73) Assignee: CeramOptec Industries, Inc., East Longmeadow, MA (US)

( * ) Notice: Subject to any disclaimer, the term of this patent is extended or adjusted under 35 U.S.C. 154(b) by 636 days.

(21) Appl. No.: 10/712,385

(22) Filed: Nov. 12, 2003

(65) Prior Publication Data

US 2005/0098545 A1   May 12, 2005

(51) Int. Cl.
*H01S 3/00* (2006.01)
(52) U.S. Cl. .................. 372/38.09; 372/38.1
(58) Field of Classification Search ............ 372/38.09, 372/38.1
See application file for complete search history.

(56) References Cited

U.S. PATENT DOCUMENTS

| | | | |
|---|---|---|---|
| 4,687,918 A | 8/1987 | Hughes et al. | |
| 4,884,275 A | 11/1989 | Simms | |
| 5,117,221 A | 5/1992 | Mishica, Jr. | |
| 5,301,347 A | 4/1994 | Kensky | |
| 6,130,754 A | 10/2000 | Greene | |
| 6,771,678 B1 * | 8/2004 | Willner et al. | 372/38.1 |

* cited by examiner

*Primary Examiner*—Minsun Oh Harvey
*Assistant Examiner*—Dung (Michael) T. Nguyen
(74) *Attorney, Agent, or Firm*—B J Associates; B. J. Skutnik

(57) ABSTRACT

A system and method is disclosed for improving the safety of directionally sensitive medical and industrial applications, such as laser applications, and cutting or surfacing tools. A system of electromagnetic radiation safety beam emitters and detectors is used to prevent a user from directing or positioning an application device, such as an electromagnetic beam source or high-power water jet, to areas outside a predefined application area and also to prevent operation of an application beam should persons or objects intersect a security boundary. In a first preferred embodiment, one or more safety beam emitters are placed in or near a treatment area, and a "safety beam" produced by the emitter is preferably directed toward the preferred position of the source of the application beam. In a second preferred embodiment, the safety beam emitter(s) is directed toward the application area of the source, and the detectors detect radiation reflected from the application area.

17 Claims, 5 Drawing Sheets

SAFETY SYSTEM FOR FOCUSED ENERGY APPLICATIONS

BACKGROUND OF THE INVENTION

1. Field of the Invention

The present invention relates to the use of lasers. In particular, the present invention relates to the field of laser safety.

2. Information Disclosure Statement

Lasers are used in a variety of industries and professions from medical to manufacturing, and have utility in countless applications. High-powered lasers in particular are used in, among others, medical and industrial applications. Such lasers must be used carefully, however, because they can be potentially damaging to users or patients who do not utilize the proper safeguards. Errant use of a high power laser can result in possible burns or ocular damage should laser light be shined in one's eye.

There are numerous laser safety systems that incorporate features such as full environmental isolation, automation, radiation shields that block or contain radiation, and trigger systems that switch lasers off when certain conditions are met.

Other approaches attempt to define a restricted area around the laser and the application through some means. These configurations generally provide that if the restricted area is breached, then the laser is somehow shut off or blocked. For example, U.S. Pat. No. 4,884,275 by Simms describes a shutoff switch used in conjunction with a hand-held infrared laser source. It is meant to shut off if someone looks into the light exit opening while it is emitting to prevent permanent or severe eye damage. Light that is reflected of an object or person within a specified distance reflects a certain intensity back to an array of photoelectric safety switches, triggering the switches and blocking the laser beam. As a result, if something comes in contact with the laser or someone looks into the beam from a dangerously close distance, the laser is blocked. This invention works to disable the beam after it has come into contact with an unintended object, but has no mechanism for preventing that person or object from approaching the beam and thus avoiding any initial contact.

U.S. Pat. No. 5,117,221 by Mishica, Jr. discloses a laser light entertainment system for use in large venues such as sports arenas. It features infrared transmitters that surround a predetermined area. If a person breaches the area, the transmitter beams are interrupted and the system will shut off. This system is effective for large scale laser uses, and is generally too complicated and expensive for use in small scale medical or industrial applications.

U.S. Pat. No. 5,301,347 by Kensky discloses a microprocessor based controller system for laser shutters. The system provides an interface at laboratory entrances, and the controller closes the shutters, thus disabling the laser beam, if there is a breach of the interface. The use of interface slot cards allows an authorized holder to use the laser and gives that holder the ability to control the shutters. This system is designed to secure an entire room, and is supported by a microprocessor for controlling the safety features.

U.S. Pat. No. 4,687,918 describes a laser pointer system consisting of a hand-held laser pointer such as those used during a lecture, a series of incoherent optical transmitters positioned around the lecture screen, and optical detectors embedded in the tip of the laser pointer that respond to the emission of the optical transmitters. As long as there is a direct line of sight between the optical transmitters and the detectors, the laser pointer is operable. If the laser pointer is directed away from the screen, it automatically switches off. The incoherent optical transmitters are preferably pulsed LEDs emitting in the IR range, and they emit radiation in a dispersed way. In order to discriminate the emitted signal from ambient light the emitted radiation is pulsed to a discriminating frequency. This invention is limited to laser pointers for presentations, and would not be suitable for other applications, especially those that require precise positioning such as medical and laser surface treatments. Additionally, this invention does not provide the ability to create a sharply defined restricted area and would not serve to protect a person who enters the area near the screen.

U.S. Pat. No. 6,130,754 describes a device for transmitting a high-power laser source that produces a high-power beam and a low power beam substantially parallel and close together or coincident. The low power beam (the barrier or cladding beam) is positioned so that an obstruction will pass through the low power beam before the high power beam. This disturbance would trigger a shut-off of the high power beam. In one embodiment, low power radiation is coaxial with and completely surrounds the smaller cross-section high-power beam, so that the high-power beam is essentially a protected core of this cladding radiation. The means to detect a disturbance in the cladding beam is integrated into the laser source, and a disturbance is detected by cladding light reflected back into the source. One disadvantage of this invention is that, although the cladding beam may serve to protect those that enter an area near the beam path, there is no restriction on the orientation of the high power beam. There is no indication that this invention will protect tissue, surfaces or persons from the beam if it is directed to a location different from the intended application or treatment area. Also, this invention is needlessly complex, as there will also be various amounts of reflection from an application surface, which would have to be taken into account. Thus, this invention would need to be calibrated for each treatment. Also, complex surfaces may require numerous calibrations which would prove time-consuming and complex and could reduce the effectiveness of the cladding beam.

The methods and apparatuses used in the state of the art can be costly, difficult to manufacture, and inconvenient. These safety devices do not allow for the flexibility in both beam movement and portability that would be desirable for certain applications and especially for medical treatments. For these applications, and for those applications where the user prefers a minimum of encumbrance, it would be useful to provide a system capable of restricting a laser beam to certain areas, or excluding a laser beam from certain areas, while allowing complete flexibility of movement in the treatment or application area.

OBJECTIVES AND BRIEF SUMMARY OF THE INVENTION

It is an object of the present invention to provide a system and method to increase the safety of laser and other directionally sensitive applications.

It is another object of the present invention to provide a safety system and method that is inexpensive, easy to manufacture, portable, and simple to integrate into preexisting methods and equipment.

It is yet another object of the present invention to provide a safety system and method that allows the user unfettered flexibility and control of a laser or other directionally sensitive application while simultaneously restricting an application beam to a predefined area.

It is further object of the present invention to provide a safety system and method that defines a restricted area to prevent persons or objects from coming in contact with a laser beam or other potentially dangerous emission.

Briefly stated, the present invention discloses a system and method for improving the safety of directionally sensitive medical and industrial applications, such as laser applications, and cutting or surfacing tools. A system of electromagnetic radiation safety beam emitters and detectors is used to prevent a user from directing or positioning a focused energy application device, such as an electromagnetic beam or high-power water jet, to areas outside a predefined application area and also to prevent operation of an application beam should persons or objects intersect a security boundary. In a first preferred embodiment, one or more emitters are placed in or near a treatment or application area, and a "safety beam" produced by the emitter is preferably directed toward the preferred position of the source of the application beam. In a second preferred embodiment, the safety beam emitter(s) is directed toward the application area of the source, and the detectors detect radiation reflected from the application area.

The above, and other objects, features and advantages of the present invention will become apparent from the following description read in conjunction with the accompanying drawings, (in which like reference numbers in different drawings designate the same elements.)

DETAILED DESCRIPTION OF PREFERRED EMBODIMENTS

The invention concerns a safety system that can be applied to a variety of focused energy radiation or particle sources. In its most basic form, the present invention consists of an emitter-detector system. The safety beam emitter or emitters preferably emit low power infrared radiation, such as that used in conventional telecommands, or visible radiation typically emitted by low power lasers or photodiodes. In one preferred embodiment (an example is shown in FIG. 1), the safety beam emitter or emitters are placed in or near the application or treatment area and oriented toward a preferred position of an application source. In another preferred embodiment (an example is shown in FIG. 2), one or more safety beam emitters are positioned to direct a low power beam of radiation toward an application/treatment area. The radiation is reflected from the application or treatment area and is detected by the detector or detectors located at or near the output of the application source.

Figure 3:
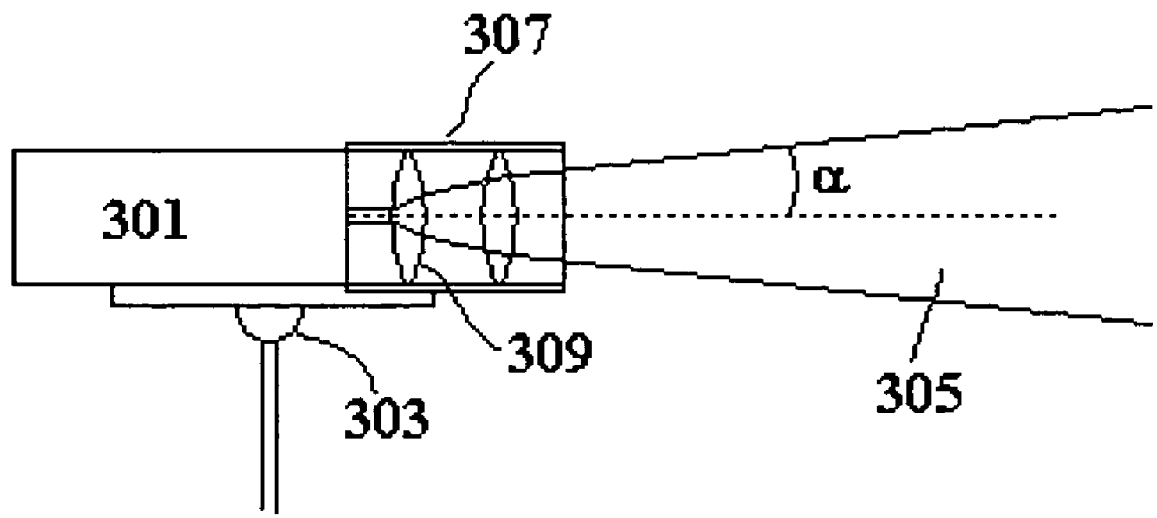
FIG. 3: Illustration of a safety beam emitter with optical system for control of beam divergence.

In a preferred embodiment, the safety beam emitter is a source producing a low power beam laser. Thereby, a monochromatic, coherent safety beam can be obtained. Preferably the safety beam is in the visible spectrum, so that it can be simply and easily adjusted. In addition, the safety beam emitter preferably incorporates an optical system, so as to control the safety beam divergence. Thereby the dimension of the safety region defined by the safety beam can be controlled. An example of a preferred safety beam emitter according to the present invention is illustrated in FIG. 3. Laser 301 is attached to holder 303 and emits safety beam 305. Safety beam 305 is of a low enough power so as not to cause injury upon contact with the eye. An example of a preferred maximum power level is 5.0 mW. Safety beam 305 is directed substantially toward a preferred position of an application source (not shown). The divergence angle α of safety beam 305 can be controlled to expand or restrict the security space, which is defined by the divergence of safety beam 305, with objective/collimator 307. Safety beam 305 enters objective/collimator 307 and is shaped by suitable lenses 309 to create the desired divergence.

Figure 4:
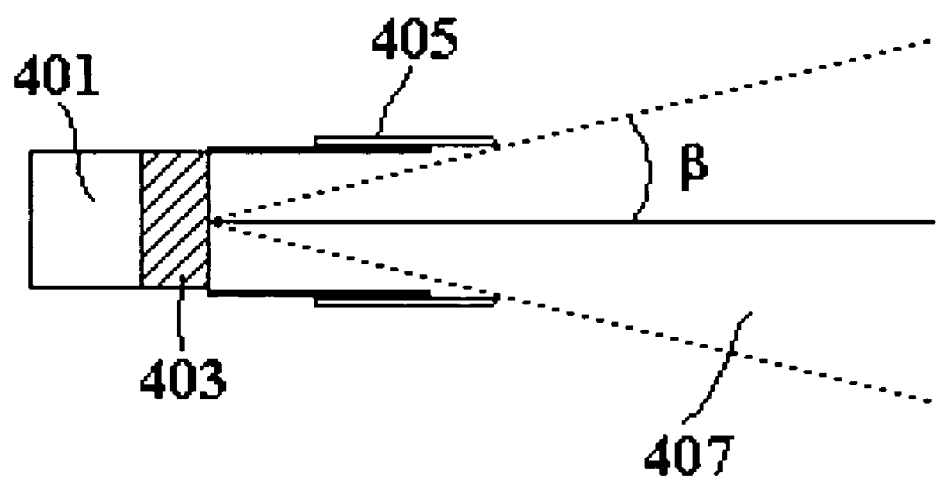
FIG. 4: Illustration of a detector with collimator or objective for control of aperture angle.

The detector can consist of any known photodetector such as a photodiode and is preferably attached to the application laser or positioned proximate to the output port or application beam origination point. The photodetector is preferably coupled with a filter centered at the emission line of the monochromatic emitter, which is preferably a visible laser. In this preferred embodiment, the detector is only responsive to the signal of the safety beam emitter and not to other sources such as ambient light or the light generated by the application source. Preferably the detector comprises an objective or collimator, so as to control the light aperture angle. An example of a detector according to the present invention is shown in FIG. 4. Photodiode 401 is connected to interference filter 403 centered at a desired wavelength. Collimator 405 is positioned to allow control of an aperture in order to be able to modify acceptance cone 407. Adjustment of the aperture changes angle β, which defines the volume of acceptance cone 407. The ability to modify acceptance cone 407 permits users to control the sensitivity of the detector. For example, acceptance cone 407 may be adjusted to control an acceptable level of deviation from a preferred orientation. As acceptance cone 407 is increased, the application source can be turned a larger degree away from its ideal direction before emission radiation cannot reach photodiode 401, and vice versa.

The system is set up so that the application beam will continue to be operable so long as the detector detects sufficient radiation from the safety beam emitter. A control system consisting of, for example, suitable electronics, is integrated with the detector and application beam source so that the application beam is automatically shut off or blocked if the radiation detected in the detector falls below prescribed levels.

As used herein, the term "application beam" refers to the emission path from a directionally sensitive application device, such as a laser, water drill, or particle beam source. The "application beam" includes, but is not limited to, a laser beam, particle beam, a water jet or water drill emission path. The term "application source" refers to any apparatus that emits an application beam as described above, such as a laser or particle beam source, or a water drill source.

A decrease in the amount of radiation detected by a detector is read by the control system, which initiates a safety response in a preselected manner depending on the amount of the decrease. Such safety response includes alerting the user of the decrease, such as by an audible alarm, blocking the laser or other application beam or shutting off the application beam source. This decrease would occur for two primary reasons. In the first instance, a decrease would occur because a person or object comes close enough to the application beam so as to at least partially block the safety beam emitter radiation and thus reduces the amount of radiation incident on the detector. In the second instance, a decrease would occur because the application source is at a location or aimed in a direction such that the detectors are no longer in the path of the safety beam emitter radiation. In either case, the present invention can be configured through a suitable control system to automatically shut off the laser or other application source if someone or something comes too close to the application beam or if the application source is pointed away from the area of application. In this way, the present invention can effectively avoid accidental injury, particularly eye injury in the case of lasers. In essence, the safety beam defines a "security boundary" and "security space" which acts to restrict movement of the application source to, or exclude foreign bodies from, a specific area.

This security space is defined by, and fills up the same volume as the safety beam. As such, modifying the volume of the safety beam modifies the security space. The divergence of the safety beam can be modified to enlarge or restrict the security space.

By using a safety beam with a large divergence, the user can move the application beam source over a larger area without appreciably changing the amount of radiation received by the detector.

The security space is defined differently in the context of preventing people and objects from getting close to the application beam. If someone or something were to intersect the safety beam, there would be no change in the detector readings unless the person or object were close enough to also intersect the boundary formed by one or more lines extending from the safety beam emitter to the detector. In this way, a "security boundary" is defined. (See FIG. 1) If this security boundary is breached, the amount of radiation incident on the detector would decrease, and the control system would respond by shutting off or blocking the application source. In a preferred embodiment, an array of detectors is positioned around the emission point or output port of the application source, preferably forming a ring around the emission point. The lines extending from each detector to the safety beam emitter essentially form a cone around the majority of the application beam. As a result, the security boundary defines a surface area rather than a volume. Any breach of this surface area would trigger an alarm and would cause the application beam to be shut off or blocked. In an additional embodiment, additional safety beam emitters can be positioned around the application area. The safety beams from each safety beam emitter will intersect as they propagate and diverge. In this way, a number of security surface areas can be established around the application beam, thus substantially eliminating any unprotected area around the application beam.

Not only does the security space define where the application source may be properly located, it also defines the permissible orientation of the application source. For example, when the application source is directed toward the safety beam emitter, the amount of radiation incident upon the detector or detectors is at a maximum. If the application source is pointed anywhere other than to the safety beam emitter, the detector reading will drop. This reading will drop gradually as the application source is pointed away from the emitter. If the application source is directed 180 degrees from its original orientation, then the radiation incident upon the detectors would be zero. The drop in the detector reading required to trigger a safety response such as an automatic shutoff can be modified to allow the user varying degrees of flexibility in the directions that an application source could be pointed. In one extreme, any decrease in intensity would trigger the shutoff, forcing the user to constantly point the application source directly at the application area. In another extreme, the shutoff would not be triggered unless there were absolutely no reading. In that case, the user could point the application source almost anywhere short of directly opposite from the application area. A user can therefore program the control system to shut off or block the application beam at a specific energy drop, thus restricting the direction in which the application source can be pointed as well as restricting the position of the application source.

In another preferred embodiment (see FIG. 2), the security space and security boundary are defined by the safety beam emitted from the safety beam emitter toward, and reflected from the application area. The reflected safety beam power is detected by the detector or detectors, which are preferably attached to the application source near the source's output port, so long as the source is directed to the application area. Thus, if the application source is aimed away from the application area, or in a position where the detector(s) are outside the volume created by the safety beam as reflected by the application area, the detector sends a signal to a control system that responds by alerting the user or disabling the application source to prevent an accident. Likewise, a person or objects intersecting the security boundary formed by the safety beam would trigger a safety response as described herein.

The control system, which preferably consists of a system of electronics, can be configured to perform different functions. A breach of the security area, or improper application source orientation will result in a decrease in radiation incident upon the detector, which will then trigger a safety response by the control system. In one embodiment, the safety response is an audible or visible alarm, alerting the user that the application source is being incorrectly aimed, or alerting a person that he or she is too close to the application beam. In this embodiment, the application beam is not disabled. In another embodiment, the application source is shut off completely or a device, such as a shutter for laser applications, is activated to temporarily block the application beam until the application source is correctly aimed or the obstruction is cleared. Alternatively, the control system can be programmed to perform different functions depending on the amount of the decrease. For example, for a smaller decrease, an alarm is triggered to alert the user or others that the application beam is incorrectly positioned or oriented, or that there is an obstruction nearby. There is thus an opportunity to correct the condition. If the amount of radiation decreases to a further preselected level, the control system shuts off or blocks the application beam. In yet another embodiment, both an alarm is activated and the application beam is shut off or blocked. This safety system can be applied in a variety of applications including both high power and low power laser applications, as is shown in the examples described below.

The proposed system is relatively simple and inexpensive and can increase, especially for handheld laser applications, the safety of laser medical treatments or other applications. The present invention is also useful for other non-laser applications, such as particle beams, or water drills. Other applications for which the present invention would be useful include industrial cutting and surfacing systems, especially water or laser cutting, drilling or surfacing applications. Development of the present invention for commercialization is also very simple, so that investments of money and time are minimized.

There are a number of additional advantages of the present invention over the prior art. The security boundary can be precisely defined by positioning the safety beam emitter and detector systems to produce a specific and highly controllable boundary. These boundaries are not defined by the divergence or volume of the safety beam, but are defined by the positions of the safety beam emitter(s) and detector(s), and thus the system is easier to manufacture, incorporate into existing treatment or application systems, and modify as needed. The position and orientation of the application beam can also be easily and precisely restricted with the present invention. Such precision in directing the position of the treatment/application beam is important, especially for laser medical treatments. Also, because the detector system, such as one or more photodiodes having certain filters, only absorbs the wavelengths emitted by the safety beam emitter(s), any interference with noise, such as ambient light, is minimized.

The present invention is described in more detail and is further illustrated by the following examples, but is not limited thereby.

EXAMPLE 1

Safety System for a High Power Laser

Figure 1A:
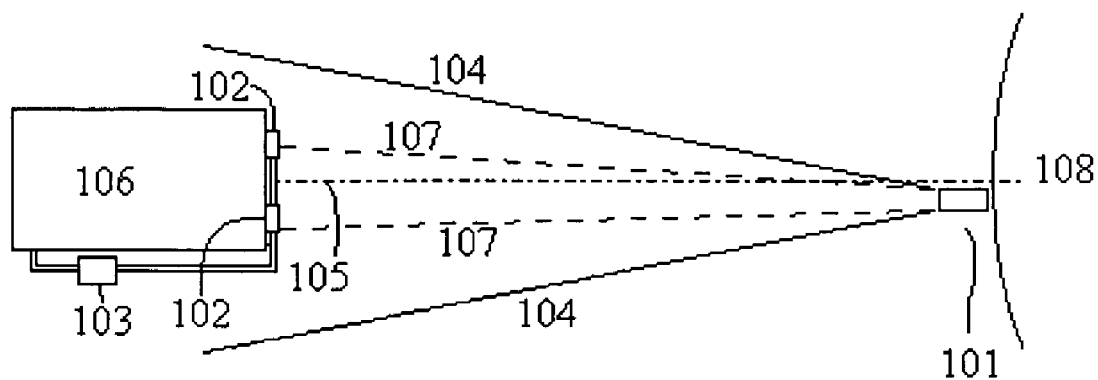
FIGS. 1a–1e: Side view diagrams of a preferred embodiment for industrial applications.
Figure 1B:
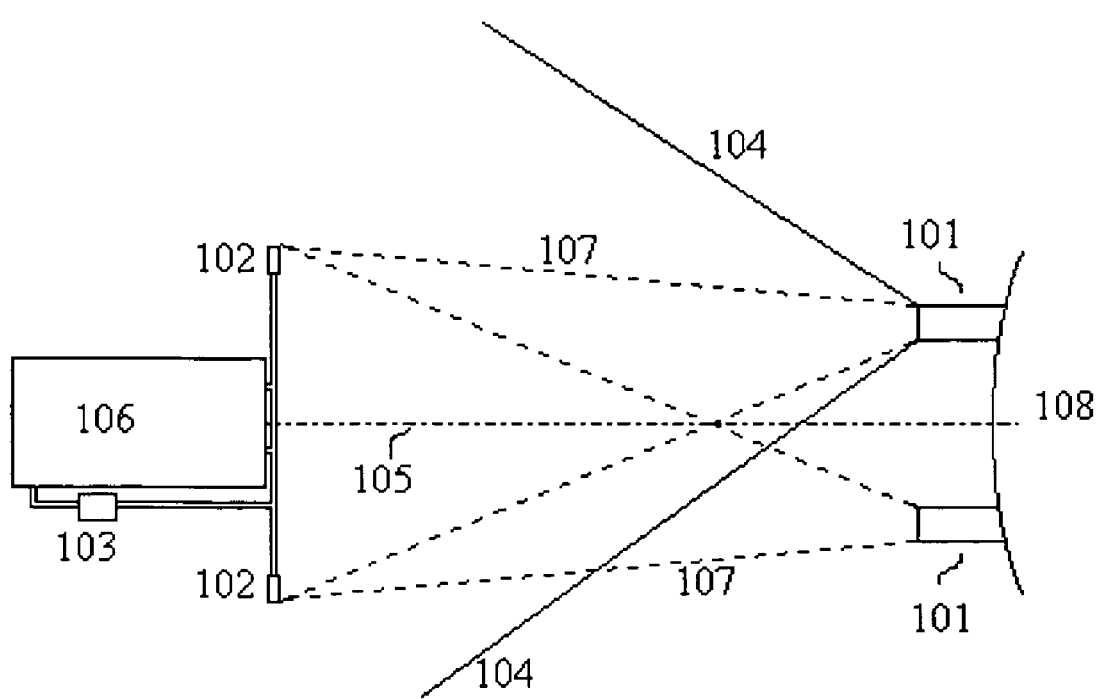
Figure 1C:
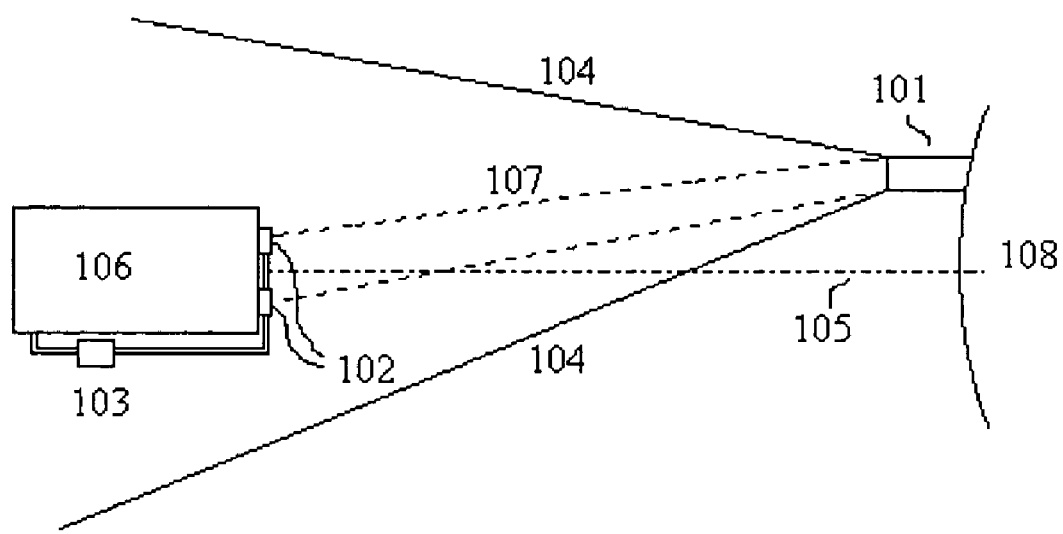
Figure 2:
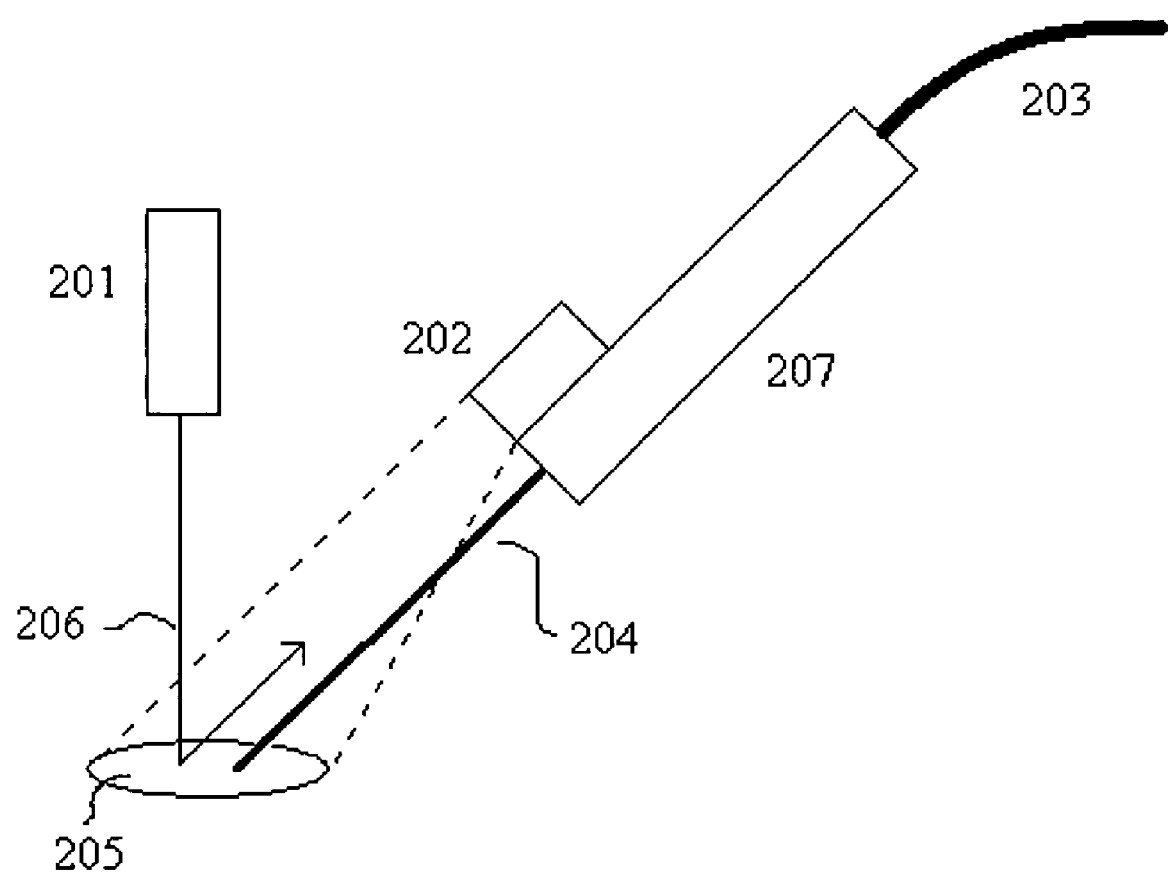
FIG. 2: A side view of a preferred embodiment for medical laser applications.

FIGS. 1a–1c illustrate a preferred embodiment of the present invention for use with high power lasers. In this case safety beam emitter 101 is positioned in or near the application area, in this case industrial process area 108. Safety beam emitter 101 produces a low power electromagnetic beam directed toward detectors 102 and generally directed along path 104 whose axis is parallel to high power laser application beam 105. Safety beam emitter 101 is therefore located at or near the point where beam 105 intersects industrial process area 108. Safety beam emitter 101 is also not necessarily located in the same plane as application beam 105, so to avoid any contact between beam 105 and emitter 101, if desired.

Detector 102 can be a photodiode to which an interference filter, whose center wavelength equals that of safety beam emitter 101, can be coupled. Detectors 102 are placed near high power laser source 106 and configured to face a direction parallel to laser 106. The imaginary line extending from safety beam emitter 101 to detector 102 defines "security boundary" 107, and is illustrated in FIGS. 1a and 1b. If a person or an object intersects security boundary 107, he or it will absorb or reflect part of the signal from the safety beam emitter, and the intensity on one or more of detectors 102 will decrease. Simple electronic control setup 103, which is integrated with detectors 102, realizes this signal change and causes an alarm to sound and shuts off or blocks high power laser 106. Thus the high power laser shot is disabled before the person or the object intersects laser application beam 105 and therefore avoids a possible accident. To maximize the portion of beam 105 that is protected, additional safety beam emitters 101 can be placed around process area 108. Additionally, detectors 102 can be placed at a greater distance from application beam source to establish a wider security boundary. An example of such a configuration is illustrated in FIG. 1b.

Figure 1D:
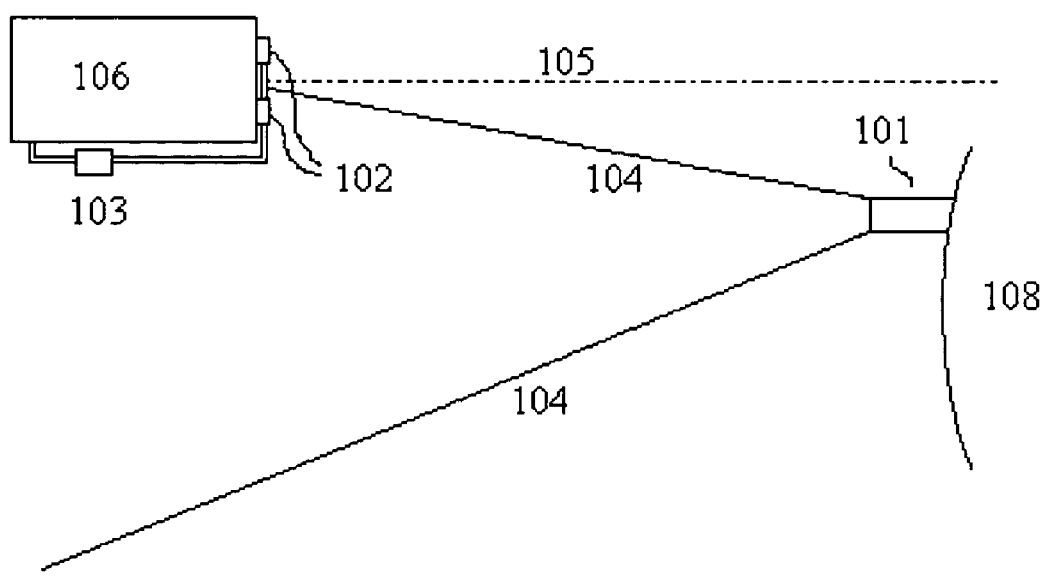
Figure 1E:
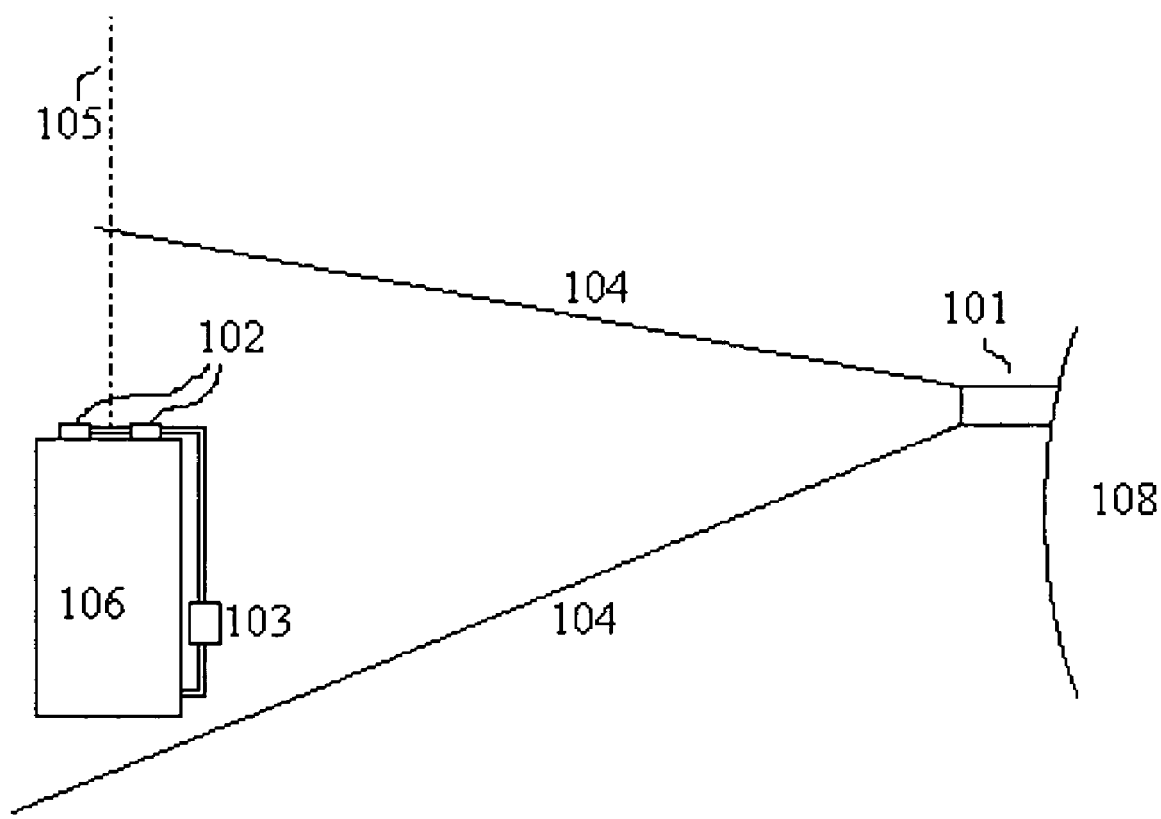

The space within beam path 104 is termed a "security space", which is responsible for preventing a user from directing application beam 105 towards an improper location. The security space is illustrated in FIGS. 1c–1e. As shown in FIG. 1c, as long as laser 106 is positioned within the security space defined by safety beam path 104, control setup 103 will allow application beam 105 to be emitted. If laser 106 is positioned outside the security boundary, as shown in FIG. 1d, the amount of radiation read by detectors 102 will decrease, prompting control setup 103 to sound an alarm and/or shut off or block beam 105. Dangerous conditions may also occur if laser 106 is pointed at an improper direction, even though it is positioned within the security space. As shown in FIG. 1e, if laser 106 is pointed away from industrial process area 108, the amount of radiation incident upon detectors 102 will decrease. The amount of decrease needed before control setup 103 shuts off or blocks the application beam can be varied depending on the size of process area 108 and the amount of flexibility in movement of laser 106 that is desired.

In this example, safety beam emitter 101 is located at industrial process application area 108 and directed to the proper position of high power application laser source 106. The divergence angle of emitted safety beam 104 can be varied, according to the needs of the application. As seen in the above figures, if safety beam emitter 101 can be placed very close to the application area, a large divergence is not needed. However, for those applications where the laser is used over a larger area, and thus safety beam emitter 101 must be placed away from beam 105, emitted safety beam 104 should have a greater divergence in order to protect the area around application beam 105.

The above example is also useful in describing a system of the present invention for use with other applications such as a high power water jet for cutting or drilling.

EXAMPLE 2

Safety System for a Medical Laser

FIG. 2 illustrates a preferred embodiment of the present invention that is particularly useful for medical applications. Safety beam emitter 201 is in this case a low power visible laser that is directed to medical application area 205 in a fixed position during treatment. The divergence of safety beam 206 can be controlled with the help of an optical system so as to define the dimensions of application area 205. Detector 202 is a photodiode with an interference filter centered at the emission line of safety laser beam 206 and attached to fiber holder 207. Thereby the detector is only responsive to the reflected light of safety beam emitter 201 and not to other light sources such as ambient light. Surgery fiber 203 is positioned within holder 207 and emits medical laser application beam 204. The detector's electronic will allow use of the application source, in this case a medical laser (not shown), only if it receives a certain quantity of signal from reflected safety beam 206 of safety beam emitter 201. In other words, if surgical fiber 203 is directed to an area other than application area 205, detector 202 will not receive sufficient energy, and the laser will be shut off or blocked with a shutter or other mechanism. The operator first directs visible safety laser 201, which is fixed to, for example, a holder, to application area 205. Then, the divergence of safety beam 206 is modified by the operator to obtain the required security space. The treatment can then be performed with the application source, which is only enabled if detector 202 receives the reflected light from safety beam 206, i.e. when application beam 204 is directed to application area 205.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A safety system for focused energy applications that ensures proper position and orientation of an application source relative to a preselected application area and prevents operation of an application beam should persons or objects intersect a security boundary, comprising:
   a focused energy application source having a directional output port;
   one or more detectors positioned near said output port, in a fixed position relative to said output port, and oriented in substantially the same direction as said output port;
   one or more safety beam emitters for generating a low power safety beam, wherein said safety beam emitters are placed in a position selected from the group consisting of a direct position wherein said safety beam is oriented toward a preferred position of said application source, and an indirect position wherein said safety beam is oriented toward said application area, and wherein said safety beam is at least partially reflected from said application area toward said preferred position of said application source; and
   a control system, wherein said control system initiates a safety response if an amount of radiation from said safety beam emitter as received by said detector decreases below a preselected level.

2. The safety system according to claim 1, wherein said one or more safety beam emitters in said direct position are located near said application area, and directed substantially toward a preferred position of said application source.

3. The safety system according to claim 1, wherein said application source is a laser.

4. The safety system according to claim 1, wherein said low power safety beam comprises an optical system to control a divergence of said safety beam.

5. The safety system according to claim 1, wherein said safety beam emitter operates in the visible spectrum.

6. The safety system according to claim 1, wherein said detector comprises a photodiode.

7. The safety system according to claim 6, wherein said detector further comprises a filter centered at a wavelength of said safety beam.

8. The safety system according to claim 1, wherein said detector has means to control an aperture angle of said safety beam radiation to be detected, and wherein said aperture control means is selected from at least one of the group consisting of an objective and a collimator.

9. The safety system according to claim 1, wherein said safety response is selected from at least one of the group consisting of shutting off said application source, activating means to block an application beam emitted from said application source, and activating an alarm.

10. The safety system according to claim 9, wherein said blocking means is a shutter.

11. The safety system according to claim 1, wherein said application source is selected from the group consisting of a particle beam generator, a water drill, a water cutting device, and a water surfacing device.

12. The safety system according to claim 1, wherein said detectors face a direction parallel to a direction of said application source.

13. The safety system according to claim 1, wherein said detectors form a ring facing said application area.

14. The safety system according to claim 1, wherein said decrease in said radiation received by said detector is due to a breach of a portion of said security boundary, wherein said security boundary is defined by a portion of said divergent beam propagating from said safety beam emitter and incident on said detectors.

15. The safety system according to claim 1, wherein said decrease in said radiation received by said detector is due to positioning of said source to a location outside a volume occupied by said safety beam.

16. The safety system according to claim 1, wherein said decrease in said radiation received by said detector is due to an orientation of said application source such that said source is directed away from a treatment site.

17. The safety system according to claim 1, wherein said application source is connected to a maneuverable handpiece.

* * * * *